(12) United States Patent
Moriyama et al.

(10) Patent No.: US 11,410,059 B2
(45) Date of Patent: Aug. 9, 2022

(54) BIAS ESTIMATION APPARATUS AND METHOD AND FAILURE DIAGNOSIS APPARATUS AND METHOD

(71) Applicant: KABUSHIKI KAISHA TOSHIBA, Tokyo (JP)

(72) Inventors: Takuro Moriyama, Kanagawa (JP); Hideyuki Aisu, Kanagawa (JP); Hisaaki Hatano, Kanagawa (JP); Kenichi Fujiwara, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1114 days.

(21) Appl. No.: 15/420,640

(22) Filed: Jan. 31, 2017

(65) Prior Publication Data
US 2017/0140287 A1 May 18, 2017

Related U.S. Application Data

(63) Continuation of application No. PCT/JP2015/004771, filed on Sep. 17, 2015.

(30) Foreign Application Priority Data

Sep. 17, 2014 (JP) .............................. JP2014-189355

(51) Int. Cl.
*G06N 5/04* (2006.01)
*G06N 20/00* (2019.01)
(Continued)

(52) U.S. Cl.
CPC ............. *G06N 5/048* (2013.01); *G05B 13/04* (2013.01); *G05B 17/02* (2013.01); *G05B 23/0245* (2013.01); *G06N 20/00* (2019.01)

(58) Field of Classification Search
CPC ........ G01C 17/18; G06N 5/048; G05B 13/04; G05N 23/024
See application file for complete search history.

(56) References Cited

U.S. PATENT DOCUMENTS 6,577,976 B1    6/2003 Hoff et al.
7,716,000 B2    5/2010 Nagao et al.
(Continued)

FOREIGN PATENT DOCUMENTS

JP    2001-184121    7/2001
JP    2003-207373    7/2003
(Continued)

OTHER PUBLICATIONS

Lyons, W.B. et al. "A multi-point optical fibre sensor for condition monitoring in process water systems based on pattern recognition" Measurement vol. 34 pp. 301-312 [Published Mar. 2003] [Retrieved May 2020] <URL: https://www.sciencedirect.com/science/article/pii/S0263224103000484 (Year: 2003).*
(Continued)

*Primary Examiner* — Ann J Lo
*Assistant Examiner* — Fen Christopher Tamulonis
(74) *Attorney, Agent, or Firm* — Finnegan, Henderson, Farabow, Garrett & Dunner L.L.P.

(57) ABSTRACT

A bias estimation apparatus according to an embodiment estimates a bias included in a measured values by each sensor. The bias estimation apparatus includes a reference model builder, a temporary bias generator, a corrected measured value calculator, a similarity calculator, a similarity selector, a score calculator, and an estimated bias determiner. The reference model builder builds a reference model of the measured value packs. The temporary bias generator generates a temporary bias pack. The corrected measured value calculator calculates corrected measured value packs.

(Continued)

The similarity calculator calculates a similarity of each corrected measured value pack. The similarity selector selects a part of the similarities according to their values from among the similarities. The score calculator calculates a score based on the selected similarities. The estimated bias determiner determines an estimated bias which is an estimated value of the bias based on the score.

13 Claims, 12 Drawing Sheets

(51) Int. Cl.
  *G05B 13/04* (2006.01)
  *G05B 17/02* (2006.01)
  *G05B 23/02* (2006.01)

(56) References Cited

U.S. PATENT DOCUMENTS

| | | | |
|---|---|---|---|
| 2003/0139908 A1* | 7/2003 | Wegerich | G06K 9/00536 702/183 |
| 2010/0198556 A1* | 8/2010 | Kost | G05B 23/024 702/183 |
| 2012/0221156 A1* | 8/2012 | Fuller | G05B 17/02 700/287 |
| 2012/0316835 A1 | 12/2012 | Maeda et al. | |

FOREIGN PATENT DOCUMENTS

| | | |
|---|---|---|
| JP | 2007-3381 | 1/2007 |
| JP | 2009-53110 | 3/2009 |
| JP | 2011-145846 | 7/2011 |
| JP | 2012-88135 A | 5/2012 |
| JP | 2012-138044 | 7/2012 |
| WO | WO 2012/090937 A1 | 7/2012 |

OTHER PUBLICATIONS

Ricardo Dunia, S. Joe Qin, Thomas F. Edgar, Thomas J. McAvoy,Use of principal component analysis for sensor fault identification, Computers & Chemical Engineering, vol. 20, Supplement 1,1996 pp. S713-S718,ISSN 0098-1354https://doi.org/10.1016/0098-1354(96)00128-7. (Year: 1996).*

Pong-Jeu Lu and Tzu-Cheng Hsu Application of Autoassociative Neural Network on Gas-Path Sensor Data Validation Journal of Propulsion and Power 2002 18:4, 879-888 https://doi.org/10.2514/2.6013 (Year: 2002).*

S. Joe Qin, Hongyu Yue, and Ricardo Dunia Industrial & Engineering Chemistry Research 1997 36 (5), 1675-1685 DOI: 10.1021/ie960615y (Year: 1997).*

Böhme, T.J., Fletcher, I. & Cox, C.S. Reliable neuro self-tuning control using autoassociative neural networks for the water treatment. Elektrotech. Inftech. 116, 375-389 (1999). https://doi.org/10.1007/BF03159199 (Year: 1999).*

Worden, K "Sensor Validation and Correction using Autoassociative Neural Networks and Principal Component Analysis" IMAC-XXI [Published 2003] [Retrieved Aug. 2021] (Year: 2003).*

Kramer, "Nonlinear Principal Component Analysis Using Autoassociate Neural Networks," AlChe Journal, Feb. 1991, 37:233-243.

International Search Report issued by the European Patent Office in International Application No. PCT/JP2015/004771, dated Dec. 18, 2015 (2 pages).

* cited by examiner

| SENSOR NAME | ESTIMATED BIAS | UNIT |
|---|---|---|
| SENSOR A | 2 | °C |
| SENSOR B | -1 | L/s |
| SENSOR C | 1 | MJ |
| SENSOR D | 0 | kW |

| MEASURED DATE | OBJECT NAME | X-COORDINATE | Y-COORDINATE |
|---|---|---|---|
| 01/01 | HUMAN | 2 | 1 |
| 01/02 | CAR | 1 | 2 |
| 01/03 | HUMAN | 1 | 0 |
| 01/04 | HUMAN | 0 | 3 |

| SENSOR NAME | THRESHOLD | UNIT |
|---|---|---|
| SENSOR A | 1 | °C |
| SENSOR B | 2 | L/s |
| SENSOR C | 3 | MJ |
| SENSOR D | 4 | kW |
| ⋮ | ⋮ | ⋮ |

| SENSOR NAME | SEASON | THRESHOLD | UNIT |
|---|---|---|---|
| SENSOR A | SUMMER | 1 | °C |
| SENSOR A | WINTER | 3 | °C |
| SENSOR B | SUMMER | 2 | L/s |
| SENSOR B | WINTER | 2 | L/s |
| SENSOR C | SUMMER | 3 | MJ |
| SENSOR C | WINTER | 1 | MJ |
| SENSOR D | SUMMER | 4 | kW |
| SENSOR D | WINTER | 3 | kW |
| ⋮ | ⋮ | ⋮ | ⋮ |

BIAS FAILURE DIAGNOSIS RESULT

| DIAGNOSIS RESULT | SENSOR NAME | ESTIMATED BIAS | THRESHOLD | UNIT |
|---|---|---|---|---|
| FAILURE | SENSOR A | 2 | 1 | °C |
| NORMAL | SENSOR B | -1 | 2 | L/s |
| NORMAL | SENSOR C | 1 | 3 | MJ |
| NORMAL | SENSOR D | 0 | 4 | kW |

FIG. 15

BIAS ESTIMATION APPARATUS AND METHOD AND FAILURE DIAGNOSIS APPARATUS AND METHOD

CROSS REFERENCE TO RELATED APPLICATIONS

This application is a Continuation of International Application No. PCT/JP2015/004771, filed on Sep. 17, 2015, the entire contents of which is hereby incorporated by reference.

FIELD

Embodiments described herein relate generally to a bias estimation apparatus and method and failure diagnosis apparatus and method.

BACKGROUND

A failure in which a constant error (bias) occurs in measured values by a sensor is referred to as a "bias failure". When an amount of the bias generated in the bias failure is estimated, in a case where the measured values are disturbed by an external factor, there has been a problem in that an accuracy of an estimated value decreases as affected by the disturbance.

BRIEF DESCRIPTION OF THE DRAWINGS

FIG. 15 is a diagram of an exemplary diagnosis result of bias failures; and

DETAILED DESCRIPTION

Embodiments will now be explained with reference to the accompanying drawings. The present invention is not limited to the embodiments.

A "sensor" in the following description outputs a single kind of measured values. Therefore, sensor does not always correspond to a physical device for measurement one-on-one since the device may output multiple kinds of measured values in a single measurement action. A device outputting multiple kinds of measured values are described by a plurality of sensors in the following description.

A bias estimation apparatus according to an embodiment estimates a bias included in measured values by a sensor. The bias estimation apparatus includes a reference model builder, a temporary bias generator, a corrected measured value calculator, a similarity calculator, a similarity selector, a score calculator, and an estimated bias determiner. In the following description, measured values by sensors in a single measurement action are referred as a "measured value pack". The reference model builder builds a reference model of the measured value packs. The temporary bias generator generates a temporary bias for each sensor and outputs them as a temporary bias pack. A temporary bias is a temporary estimated value of the bias included in measured values by a sensor and a bias pack means a group of each sensor's bias. The corrected measured value calculator calculates a corrected measured value pack for each measured value pack by using the temporary bias pack. The similarity calculator calculates a similarity of each corrected measured value pack relative to the reference model. The similarity selector selects a part of the similarities according to their values from among the similarities calculated for each corrected measured value pack. The score calculator calculates a score indicating a similarity of the whole corrected measured value packs relative to the reference model based on the selected similarities. The estimated bias determiner determines an estimated bias for each sensor. An estimated bias is an estimated value of the bias included in measured values by a sensor.

First Embodiment

A bias estimation apparatus and method according to a first embodiment will be described with reference to FIGS. 1 to 6. The bias estimation apparatus and method according to the present embodiment estimate a bias included in measured values by a sensor. The bias is a constant error included in the measured values. The sensor, of which the bias is to be estimated, includes any sensors such as a temperature sensor and a humidity sensor.

Figure 1:
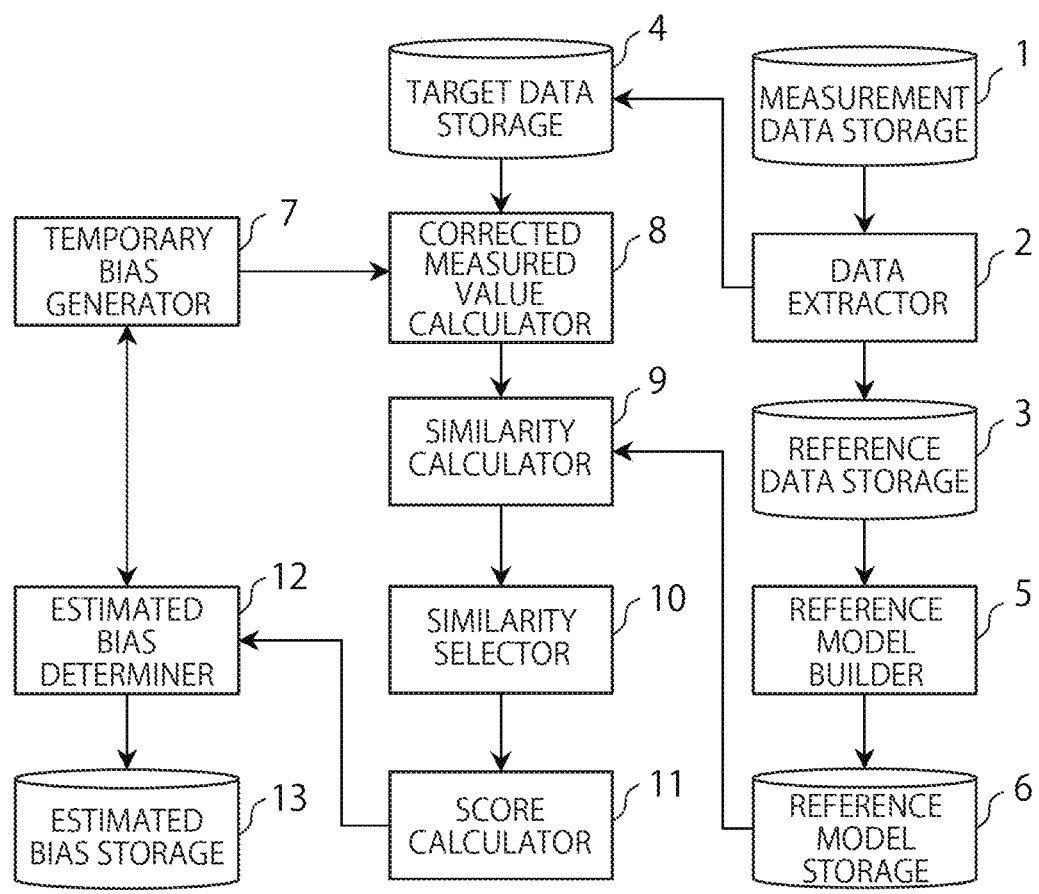
FIG. 1 is a block diagram of a function configuration of a bias estimation apparatus according to a first embodiment.

First, the bias estimation apparatus according to the first embodiment will be described with reference to FIGS. 1 to 3. FIG. 1 is a block diagram of a function configuration of the bias estimation apparatus according to the present embodiment. As illustrated in FIG. 1, the bias estimation apparatus includes a measurement data storage 1, a data extractor 2, a reference data storage 3, a target data storage 4, a reference model builder 5, a reference model storage 6, a temporary bias generator 7, a corrected measured value calculator 8, a similarity calculator 9, a similarity selector 10, a score calculator 11, an estimated bias determiner 12, and an estimated bias storage 13.

The measurement data storage 1 stores measured value packs obtained by a plurality of times of measurements. As described before, the measured value pack is the measured values by sensors in a single measurement action. Each measured value pack and the corresponding related information pack are linked and stored in the measurement data storage 1 as a measurement data. A single or a plurality of information related to a measurement action is referred as a "related information pack." The measurement data storage 1 stores a plurality of measurement data as a measurement data group.

Figure 2:
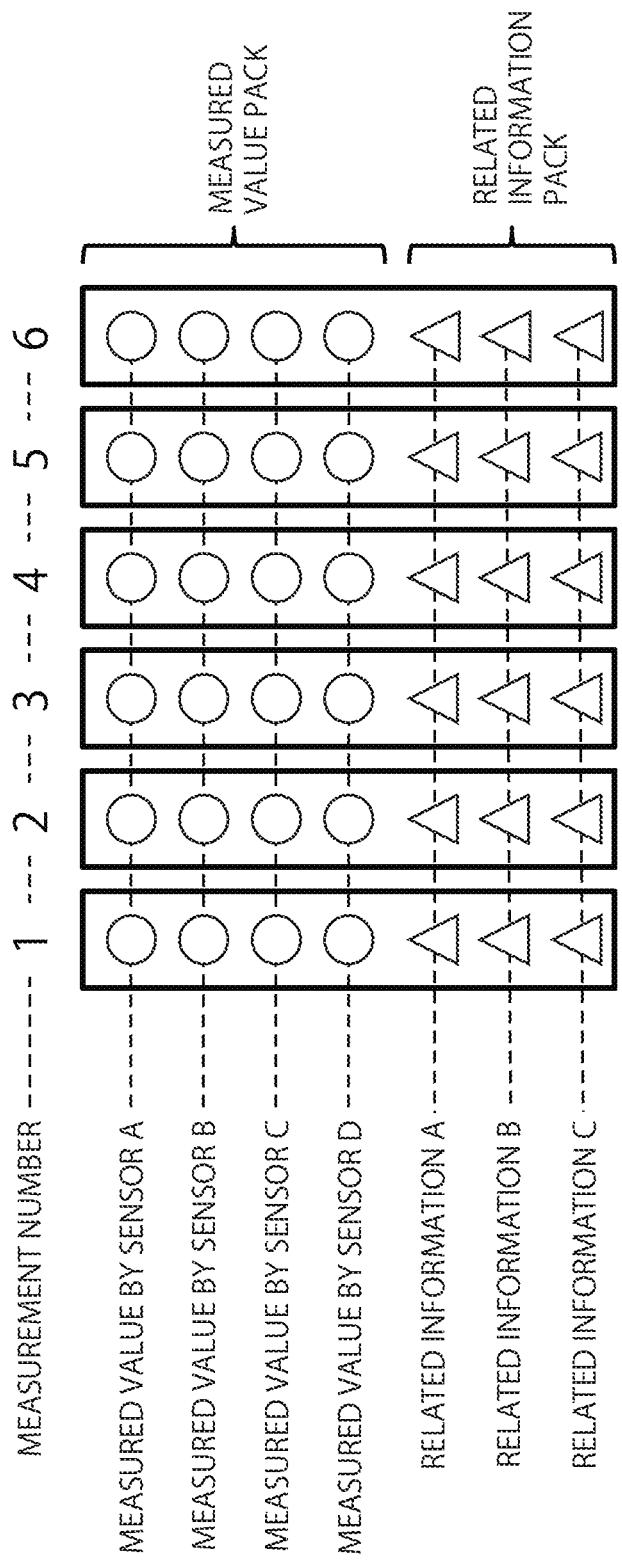
FIG. 2 is a diagram of an exemplary measurement data group.
Figure 3:
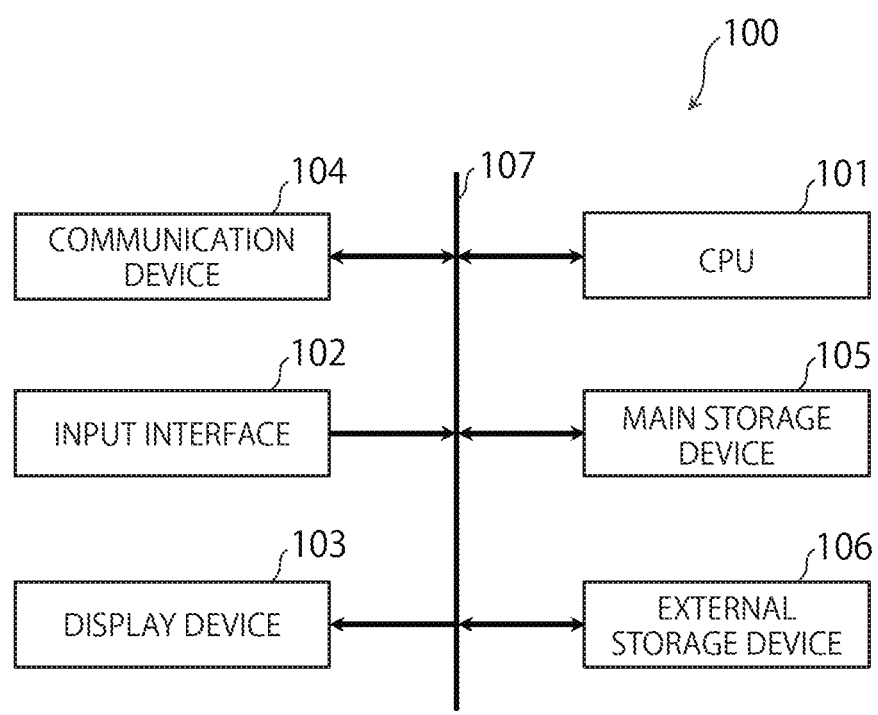
FIG. 3 is a block diagram of a hardware configuration of the bias estimation apparatus in FIG. 1.

FIG. 2 is a diagram of an exemplary measurement data group stored in the measurement data storage 1. In FIG. 2, the measurement data group includes six measurement data having measurement numbers 1 to 6. Each measurement data includes the measured value pack with four measured values by sensors A to D and the related information pack with three related information A to C. In this way, each measurement data includes one measured value pack and one related information pack. The related information is, for example, a measured date and a measured state. However, the related information is not limited to these.

The data extractor 2 extracts a reference data group and a target data group from among a plurality of the measurement data stored in the measurement data storage 1.

The reference data group is a part of the measurement data group whose measured value packs are assumed to include almost no bias or no bias since the corresponding sensors normally operated. The reference data group is used as a reference to estimate the bias for each sensor. The data extractor 2 extracts, for example, a plurality of measurement data in a predetermined period immediately after the inspection of sensors as reference data group. Here, a period when measurement data is extracted as a part of the reference data group can be optionally set. The reference data group extracted by the data extractor 2 is stored in the reference data storage 3.

The target data group is a part of measurement data group to be a bias estimated target or a failure diagnosis target to be described. The bias estimation apparatus estimates the biases included in measured value packs in the target data group. The data extractor 2 extracts, for example, a plurality of measurement data in a recent predetermined period as target data group. Here, a period when measurement data is extracted as a part of the target data group can be optionally set. The target data group extracted by the data extractor 2 is stored in the target data storage 4.

The reference model builder 5 builds the reference model based on the reference data group stored in the reference data storage 3. The reference model is a mathematical model which can be used to calculate a similarity between a measure value pack and the measured value packs in the reference data group in the similarity calculator 9.

The reference model builder 5 can build the reference model by using any methods such as principal component analysis and a neural network when a condition is satisfied that the method can be used to calculate the similarity. A method for building the reference model by the reference model builder 5 will be described below. The reference model built by the reference model builder 5 is stored in the reference model storage 6.

The temporary bias generator 7 generates a temporary bias for each sensor and outputs them as a temporary bias pack. The temporary bias is a temporary estimated value of the bias. The bias estimation apparatus evaluates a plurality of temporary bias packs according to the score to be described and determines the estimated bias pack from among the temporary bias packs. The estimated bias pack is composed of the estimated biases and the estimated bias is an estimated value of the bias obtained as an estimation result by the bias estimation apparatus.

The temporary bias generator 7 generates the temporary bias pack with the same dimension as that of the measured value pack of the target data. That is, when the measured value pack of the target data includes n measured values and is expressed by an n-dimensional vector, the temporary bias pack is also an n-dimensional vector. At this time, a measured value by a sensor i becomes the i-th element of the vector corresponding to the measured value pack, and a temporary bias of the sensor i becomes the i-th element of the vector corresponding to the temporary bias pack.

For example, when the target data is the measurement data illustrated in FIG. 2, the measured value pack in the target data includes four measured values. Therefore, the measured value pack is expressed by a four-dimensional vector. In this case, the temporary bias pack is also expressed by the four-dimensional vector. For example, a measured value by a sensor A (i=1) becomes a first element of the vector corresponding to the measured value pack, and a temporary bias of the sensor A becomes a first element of the vector corresponding to the temporary bias pack.

The temporary bias generator 7 can generate the temporary bias pack by using any methods such as genetic algorithm and particle swarm optimization. A method for generating the temporary bias pack by the temporary bias generator 7 will be described below.

The corrected measured value calculator 8 calculates the corrected measured value packs by correcting the measured value packs in the target data group stored in the target data storage 4, according to the temporary bias pack generated by the temporary bias generator 7. The corrected measured value of a sensor is a value obtained by subtracting the temporary bias of the sensor from the measured value of the sensor. In the following description, a data composed of a corrected measured value pack and the related information pack linked to the measured value pack which is used for calculating the corrected measured value pack is referred as a corrected data. The corrected measured value calculator 8 generates a plurality of corrected data as a corrected data group.

The measured value pack of the corrected data has the same dimension as that of the measured value pack of the target data. That is, when the measured value pack of the target data is n dimension, the measured value pack of the corrected data is also n dimension. Also, since the corrected measured value calculator 8 generates the corrected data relative to each target data, a plurality of corrected data as many as the target data included in the target data group is generated.

The similarity calculator 9 calculates a similarity between each corrected data in the corrected data group generated by the corrected measured value calculator 8 and the reference data group by using the reference model stored in the reference model storage 6. The higher calculated similarity means that the measure value pack in the corrected data and those in the reference data group are more similar.

It is considered here that each measured value in a measured value pack in the target data be obtained as the result that a bias is added to a measured value including no bias. The measured value pack in a corrected data is a result that the temporary bias pack is subtracted from the measured value pack in a target data. Therefore, the higher similarity of the measured value pack in the corrected data means the closer distance between the bias pack included in the measured value pack of the target data and the temporary bias pack.

The similarity calculator 9 calculates the similarity for each corrected data. The similarity calculator 9 generates a similarity data including the similarity and the related information pack which is same as that of the corrected data used in calculating the similarity. Since the similarity calculator 9 generates the similarity data for each corrected data, a plurality of similarity data (similarity data group) as many as the corrected data included in the corrected data group is generated. The similarity can be calculated by the similarity calculator 9 by using any methods. A method for calculating the similarity by the similarity calculator 9 will be described below.

The similarity selector 10 selects a plurality of the similarity data calculated by the similarity calculator 9 according to their similarities. The group of similarity data selected by the similarity selector 10 is used to calculate the score as to be described. The method for selecting the similarity data by the similarity selector 10 will be described below.

The score calculator 11 calculates the score based on the similarity data group selected by the similarity selector 10. The score is a value in which the similarity between the measured value packs of the corrected data group and those of the reference data group is evaluated based on the reference model in the reference model storage 6. The score is, for example, an average value, a median, and a mode of the similarities included in the selected similarity data group. However, the score is not limited to these. A method for calculating the score by the score calculator 11 will be described below.

The estimated bias determiner 12 determines the estimated bias pack from among a plurality of temporary bias packs generated by the temporary bias generator 7 based on the score calculated by the score calculator 11. Specifically, the estimated bias determiner 12 makes the temporary bias generator 7 repeatedly generate the temporary bias pack until a predetermined termination condition is satisfied, and then, determines the temporary bias pack having the maximum score from among the generated plurality of temporary bias packs as the estimated bias pack. That is, the estimated bias determiner 12 determines the estimated bias pack by searching for the temporary bias pack with the maximum score. The estimated bias pack determined by the estimated bias determiner 12 is stored in the estimated bias storage 13 as the estimation result by the bias estimation apparatus.

Next, a hardware configuration of the bias estimation apparatus according to the present embodiment will be described with reference to FIG. 3. The bias estimation apparatus according to the present embodiment is configured by a computer device 100 as illustrated in FIG. 3. The computer device 100 includes a CPU 101, an input interface 102, a display device 103, a communication device 104, a main storage device 105, and an external storage device 106, and these are connected with each other with a bus 107.

The central processing unit (CPU) 101 executes a bias estimation program in the main storage device 105. The bias estimation program is a program for realizing the above-mentioned function configurations of the bias estimation apparatus. The CPU 101 executes the bias estimation program, and accordingly, each function configuration is realized.

The input interface 102 inputs an operation signal from an input device such as a keyboard, a mouse, and a touch panel to the bias estimation apparatus. The input interface 102 is, for example, an USB and the Ethernet. However, the input interface 102 is not limited to these. Information on the periods of the reference data and the target data and the like can be input to the bias estimation apparatus via the input interface 102.

The display device 103 displays a video signal output from the bias estimation apparatus. The display device 103 is, for example, a liquid crystal display (LCD), a cathode-ray tube (CRT), and a plasma display (PDP). However, the display device 103 is not limited to these. Information such as the estimated bias pack stored in the estimated bias storage 13 can be displayed by the display device 103.

The bias estimation apparatus is wirelessly or wiredly communicated with an external device by the communication device 104. The communication device 104 is, for example, a modem and a router. However, the communication device 104 is not limited to these. Information such as the measurement data, the reference data, and the target data can be input from the external device via the communication device 104. In this case, it is not necessary for the bias estimation apparatus to include the measurement data storage 1, the data extractor 2, the reference data storage 3, and the target data storage 4.

The main storage device 105 stores the bias estimation program, a necessary data to execute the bias estimation program, a data generated by the execution of the bias estimation program, and the like. The bias estimation program is executed in the main storage device 105. The main storage device 105 is, for example, a RAM, a DRAM, and a SRAM. However, the main storage device 105 is not limited to these. The measurement data storage 1, the reference data storage 3, the target data storage 4, the reference model storage 6, and the estimated bias storage 13 may be constructed in the main storage device 105.

The external storage device 106 stores the bias estimation program, the necessary data to execute the bias estimation program, the data generated by the execution of the bias estimation program, and the like. These programs and data are read out and stored in the main storage device 105 when the bias estimation program is executed. The external storage device 106 is, for example, a hard disk, an optical disk, a flash memory, and a magnetic tape. However, the external storage device 106 is not limited to these. The measurement data storage 1, the reference data storage 3, the target data storage 4, the reference model storage 6, and the estimated bias storage 13 may be constructed in the main storage device 105.

The bias estimation program may be previously installed to the computer device 100 and may be stored in a storage media such as a CD-ROM. Also, the bias estimation program may be uploaded on the internet.

Figure 4:
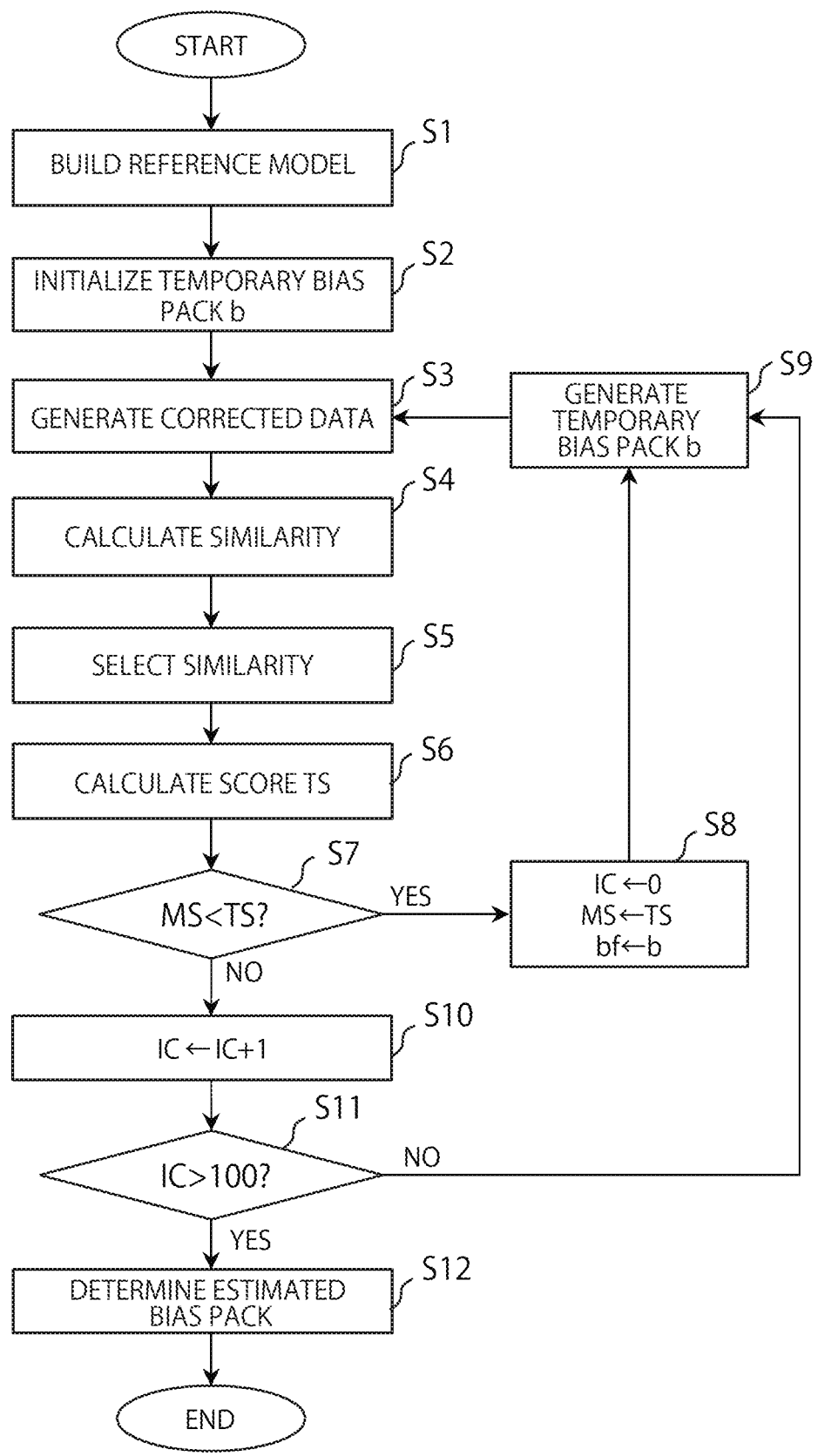
FIG. 4 is a flowchart of an operation of the bias estimation apparatus in FIG. 1.

Next, the bias estimation method according to the present embodiment will be described with reference to FIGS. 4 to 6. FIG. 4 is a flowchart of an operation of the bias estimation apparatus according to the present embodiment. The bias estimation apparatus determines the estimated bias pack by a plurality of times of searches. The operation of the bias estimation apparatus will be described below in detail by using a specific example.

First, when a first search starts, the reference model builder 5 builds the reference model in step S1. First, the data extractor 2 extracts the reference data group and the target data group from the measurement data storage 1, and then, respectively stores them in the reference data storage 3 and the target data storage 4. The measured value packs of the reference data group and the target data group respectively stored in the reference data storage 3 and the target data storage 4 are expressed as follows.

measured value packs of reference data group: $\hat{X} := [\hat{x}_1, \hat{x}_2, \ldots, \hat{x}_K]^T \in \mathbb{R}^{K \times n}$ measured value packs of target data group: $X := [x_1, x_2, \ldots, x_N]^T \in \mathbb{R}^{N \times n}$ [formula 1]

In the above-mentioned formula, K indicates the number of the reference data, and N indicates the number of the target data, and n indicates the number of the sensors. Also, the respective elements (for example, $x_1$) of the respective measured value packs are n-dimensional vectors including n measured values.

Next, the reference model builder 5 obtains the reference data group from the reference data storage 3 and obtains principal components of the measured value packs of the reference data group and eigenvalues corresponding to the principal components according to principal component analysis. The principal components and the eigenvalues are expressed by the following formulas.

principal components: $P_a := [p_1, p_2, \ldots, p_n] \in \mathbb{R}^{n \times n}$ eigenvalues: $L_a := [\lambda_1, \lambda_2, \ldots, \lambda_n]^T \in \mathbb{R}^n \ s.t. \ \lambda_1 \geq \lambda_2 \geq \ldots \geq \lambda_n$ [formula 2]

In the above-mentioned formula, the i-th element $p_i$ of the principal components corresponds to the i-th element $\lambda_i$ of the eigenvalues. The reference model builder 5 extracts the eigenvalues in the top 85% from the largest value and builds a reference model P below from the principal components corresponding to the extracted eigenvalues.

$$P := [p_1, p_2, \ldots, p_m] \in \mathbb{R}^{n \times m} \ s.t. \ m < n, \ \frac{\left(\sum_{i=1}^{m} \lambda_i\right)}{\left(\sum_{i=1}^{n} \lambda_i\right)} \geq 0.85$$ [formula 3]

The reference model P built in this way is stored in the reference model storage 6. The reference model is not limited to the above-mentioned reference model P and may be built by using other method. Also, the extracted eigenvalues are not limited to the top 85%.

In step S2, the temporary bias generator 7 initializes variables $b$, $b_f$, MS, TS, and IC as follows.

$b \leftarrow [0,0,\ldots,0]^T \in \mathbb{R}^n$ $b_f \leftarrow [0,0,\ldots,0]^T \in \mathbb{R}^n$ $MS \leftarrow -Inf \in \mathbb{R}$ $TS \leftarrow 0 \in \mathbb{R}$ $IC \leftarrow 0 \in \mathbb{R}$ [formula 4]

The variable b is a variable for the latest temporary bias pack generated by the temporary bias generator 7. The variable $b_f$ is a variable for the temporary bias pack with the maximum score. As described above, since the temporary bias pack has the same dimension as that of the measured value pack of the target data, the variables b and $b_f$ are n-dimensional vectors. The i-th elements of the variables b and $b_f$ are the temporary biases of the sensor i.

Also, the variable MS is a variable for the maximum score. The value −Inf means a negative infinity in a value calculation. The variable TS is a variable for the latest score calculated by the score calculator 11. The variable IC is a variable for increment. The variable IC is used to determine a termination condition of processing.

The corrected measured value calculator 8 generates the corrected data group in step S3. As described above, the measured value pack in a corrected data is generated by subtracting the temporary bias pack from the measured value pack in the target data. Therefore, the corrected data group is expressed as follows.

measured value packs of target data group: $X := [x_1, x_2, \ldots, x_N]^T \in \mathbb{R}^{N \times n}$ measured value packs of corrected data group:
$\tilde{X} = [x_1 - b, x_2 - b, \ldots, x_N - b]^T = [\tilde{x}_1, \tilde{x}_2, \ldots, \tilde{x}_N]^T \in \mathbb{R}^{N \times n}$ [formula 5]

The similarity calculator 9 calculates the similar each corrected data included in the corrected data group relative to the reference model in step S4. First, the similarity calculator 9 calculates an error of each corrected data relative to the reference model. The error is expressed as follows.

error of the i-th corrected data: $e_i := \|\tilde{x}_i - PP^T \tilde{x}_i\|_2^2 \in \mathbb{R}$ errors in corrected data group: $E := [e_1, e_2, \ldots, e_N]^T \in \mathbb{R}^N$ [formula 6]

Next, the similarity calculator 9 calculates the similarity of each corrected data relative to the reference model based on the above-mentioned error. The similarity is expressed as follows.

similarity of the i-th corrected data: $s_i := \frac{1}{1 + e_i} \in \mathbb{R}$ [formula 7]

similarities in corrected data group: $S := [s_1, s_2, \ldots, s_N]^T \in \mathbb{R}^N$ Accordingly, a similarity $s_i$ of each corrected data is calculated, and a similarity group S is generated. The similarity is not limited to the above-mentioned similarity $s_i$ and may be calculated by using other method.

In step S5, the similarity selector 10 selects the similarities in the 10% from the largest value from among the similarity group S. The selected plurality of similarities is substituted into a variable R.

The score calculator 11 calculates a score TS of the temporary bias pack b in step S6. In the present embodiment, an average value of the similarities included in the variable R is calculated as the score TS. That is, the score TS is the average value of the similarities in the top 10% of the similarity group S. By calculating the score TS in this way, an estimation accuracy of the bias can be improved in the condition where the measured values by the sensor are as follows.

Figure 5:
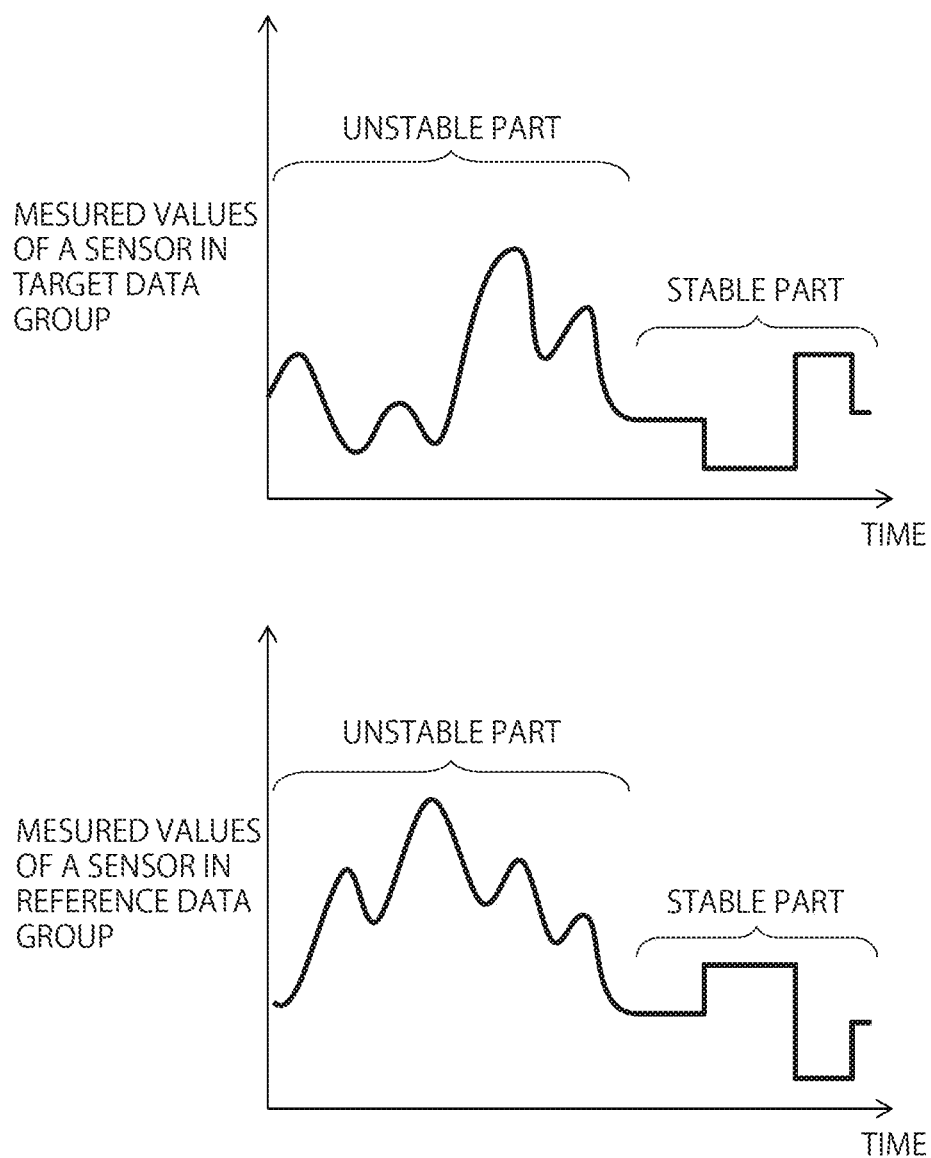
FIG. 5 is a diagram of an unstable part and stable part of measured values.

As illustrated in FIG. 5, a condition is considered in which the measured value packs of the target data group are separated into two parts, i.e., an unstable part where the measured value packs drastically change according to external factors and a stable part which can be frequently observed in the measured value packs of the measurement data group stored in the measurement data storage 1 because of almost no external factor or no external factor.

Under this condition, it is more difficult to correctly estimate the bias pack from the unstable part compared with the stable part. This is because it is possible that noises from external factors act in a direction to make the bias hard to be estimated. Therefore, it is preferable that the score TS be calculated by using the similarities in the stable part in order to improve the estimation accuracy of the bias pack.

Here, it is considered that the similarity in the stable part has a strong tendency to be the similarity with larger value from among the similarities included in the similarity group S. This is because the stable part indicates measured value packs observed frequently and it is highly possible the reference data group includes the similar measured value packs to those in the stable part of the target data group. On the other hand, it is considered that the similarity in the unstable part has a strong tendency to be the similarity with smaller value from among the similarities included in the similarity group S. This is because the unstable part indicates measured value packs observed rarely and it is highly unlikely the reference data group includes the similar measured value packs to those in the unstable part of the target data group. Therefore, as the present embodiment, the effect by the unstable part can be reduced and the estimation accuracy for the bias pack can be improved by calculating the score TS by using the similarities with the larger values, that is, the similarities in the stable part from among the similarities included in the similarity group S.

In step S7, the estimated bias determiner 12 compares the score TS calculated by the score calculator 11 with the maximum score MS. In the first search, since the maximum score MS is initialized to the negative infinity as described above, MS<TS (step S7: YES). The procedure proceeds to step S8.

In step S8, the estimated bias determiner 12 updates the variables IC, MS, and $b_f$ as follows.

$$IC \leftarrow 0 \in \mathbb{R}$$

$$MS \leftarrow TS$$

$$b_f \leftarrow b \quad \text{[formula 8]}$$

That is, the estimated bias determiner 12 initializes the variable IC, sets the maximum score MS to the score TS, and sets the temporary bias pack $b_f$ corresponding to the maximum score MS to the temporary bias pack b corresponding to the score TS. Accordingly, the first search ends.

After that, the estimated bias determiner 12 requests in step S9 the temporary bias generator 7 to generate a new temporary bias pack b. The temporary bias generator 7 generates the new temporary bias pack b by adding a predetermined noise to the current $b_f$. The bias estimation apparatus starts a second search.

An n-dimensional random number vector can be used as a noise to generate the new temporary bias pack b. For example, the random number vector is generated from a normal distribution N (0, $\varepsilon^2$) of average zero and standard deviation $\varepsilon$.

In the second search, when the score TS is equal to or less than the maximum score MS (step S7: NO), the procedure proceeds to step S10.

In step S10, the estimated bias determiner 12 updates the variable IC as follows.

$$IC \leftarrow IC+1 \quad \text{[formula 9]}$$

That is, the estimated bias determiner 12 adds one to the variable IC. At this time, the maximum score MS and the temporary bias pack $b_f$ corresponding to the maximum score MS are not updated.

In step S11, the estimated bias determiner 12 determines whether the variable IC exceeds 100. In a case of IC s 100 (step S11: NO), the procedure proceeds to step S9. Whereas, in a case of IC>100 (step S11: YES), the procedure proceeds to step S12.

In step S12, the estimated bias determiner 12 determines the temporary bias pack $b_f$, which has been set at that time, as the estimation result by the bias estimation apparatus, that is, the estimated bias pack.

That is, the bias estimation apparatus repeats the generation of the temporary bias pack and the evaluation according to the score and searches for the temporary bias pack with the maximum score until the termination condition is satisfied. Then, the bias estimation apparatus outputs the temporary bias pack with the maximum score as the estimated bias pack.

The estimated bias pack determined in this way is stored in the estimated bias storage 13. The estimated bias pack stored in the estimated bias storage 13 can be displayed by the display device 103.

Figures 6, 7:
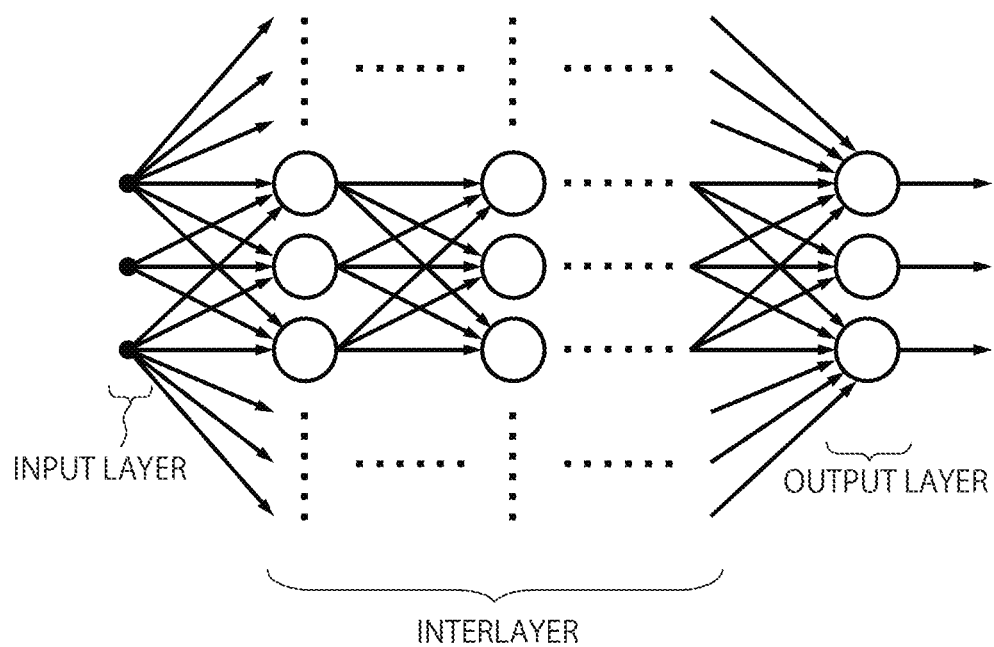
FIG. 6 is a diagram of an exemplary estimation result of biases.
FIG. 7 is a diagram of a schematic configuration of a neural network according to a second embodiment.

Here, FIG. 6 is a diagram of an exemplary estimation result displayed on the display device 103. As described above, the estimated bias pack has the same dimension as that of the measured value pack. Therefore, as illustrated in FIG. 6, the values included in the estimated bias pack can be displayed with respect to each sensor (sensors A to D).

As described above, the bias estimation apparatus and method according to the present embodiment calculate the score by using the similarities in the stable part and can determine the temporary bias pack with the maximum score as the estimated bias pack. Therefore, reduction in the estimation accuracy caused by the external factors can be prevented, and the estimation accuracy of the bias pack can be improved.

Also, since the estimated bias pack obtained as the estimation result has the same dimension as that of the measured value pack, a user can easily recognize which sensor the measured values by is estimated to include the bias from the estimation result. Therefore, the user can easily use the estimation result for decision making and failure diagnosis.

In step S5, the similarities selected by the similarity selector are not limited to the similarities in the top 10%. The similarity selector 10 may select, for example, the similarities in the top 20% and the similarities equal to or more than a predetermined threshold.

Also, in step S6, the score calculated by the score calculator 11 is not limited to the average value of the selected similarities. The score may be a median and a mode of the selected similarities.

In addition, the termination condition in step S11 is not limited to IC>100 and may be IC>10 and IC>1000. Also, the termination condition may be determined by the total number of times of searches. In this case, in step S8, it is preferable that the IC be not reset and IC←IC+1 be satisfied.

Second Embodiment

A bias estimation apparatus and method according to a second embodiment will be described with reference to FIG. 7. In the present embodiment, a reference model is built by using a neural network. Other components are similar to those of the first embodiment.

FIG. 7 is a diagram of a structure of the neural network used in the present embodiment. The input layer and output layer of the neural network have the same n dimension as that of the measured value pack of the measurement data. The restrictions on the other structures of the neural network, that is, a structure of interlayers can be optionally set according to the usage. For example, "Autoassociative Neural Network" disclosed in "Nonlinear principal component analysis using autoassociative neural networks," AIChE Journal, vol. 37, no. 2, pp. 233-243, 1991. written by M. A. Kramer can be used as the neural network.

In the bias estimation apparatus according to the present embodiment, a reference model builder 5 makes the neural network in FIG. 7 learn measured value packs of a reference data group. Specifically, the reference model builder 5 builds the neural network to make an input to it and the resulting output be the same when the input is a measured value pack in the measured value packs of a reference data group. The learning of the neural network by the reference model builder 5 may have purposes other than the purpose to make the input and the resulting output be the same. One of the purposes is, for example, to prevent parameters of neural network from taking extreme values. In the present embodiment, the reference model is the neural network resulting from the learning by reference model builder 5.

Here, the bias estimation method according to the present embodiment will be described. First, the reference model builder 5 builds a reference model f in step S1. The reference model f is the neural network, which has performed the learning, expressed as a function. Both an input to the reference model f and the resulting output have the same dimension.

After that, the procedure before step S3 is similar to that of the first embodiment. That is, the corrected measured value calculator 8 generates a following corrected data group in step S3.

measured value packs of target data group: $X:=[x_1, x_2, \ldots, x_N]^T \in \mathbb{R}^{N \times n}$ measured value packs of corrected data group: $\tilde{X}:= [x_1-b, x_2-b, \ldots, x_N-b]^T = [\tilde{x}_1, \tilde{x}_2, \ldots, \tilde{x}_N]^T \in \mathbb{R}^{N \times n}$ [formula 10]

The similarity calculator 9 calculates the similarity of each corrected data included in the corrected data group relative to the reference model f in step S4. First, the similarity calculator 9 calculates an error of each corrected data relative to the reference model. The error is expressed as follows in the present embodiment.

error of the i-th corrected data: $e_i := \|\tilde{x}_i - f(\tilde{x}_i)\|_2^2 \in \mathbb{R}$ errors in corrected data group: $E := [e_1, e_2, \ldots, e_N]^T \in \mathbb{R}^N$ [formula 11]

Next, the similarity calculator 9 calculates the similarity of each corrected data relative to the reference model f based on the above-mentioned error. The similarity is expressed as follows, which takes the same form as the first embodiment.

similarity of the i-th corrected data: $s_i := \dfrac{1}{1+e_i} \in \mathbb{R}$ [formula 12]

similarities in corrected data group: $S := [s_1, s_2, \ldots, s_N]^T \in \mathbb{R}^N$ Accordingly, a similarity $s_i$ of each corrected data is calculated, and a similarity group S is generated. Each step after this is similar to that of the first embodiment.

As described above, according to the present embodiment, the reference model can be built by using the neural network. Also, the reference model according to the usage can be easily built by adding purposes other than the purpose to make the input to the neural network and the resulting output be the same.

Third Embodiment

A bias estimation apparatus and method according to a third embodiment will be described. In the present embodiment, a score is calculated by using the maximum value and the median value of similarities. Other components are similar to those of the first embodiment.

In the bias estimation apparatus according to the present embodiment, a similarity selector 10 selects the maximum similarity and the median similarity from among the similarities calculated by a similarity calculator 9. A score calculator 11 calculates the score based on the two similarities selected by the similarity selector 10.

Here, the bias estimation method according to the present embodiment will be described. Operations of the bias estimation apparatus according to the present embodiment in steps S1 to S4 are similar to those of the first embodiment. In step S4, it is assumed that a following similarity group S be obtained similarly to the first embodiment.

similarities in corrected data group: $S:=[s_1, s_2, \ldots, s_N]^T \in \mathbb{R}^N$ [formula 13]

In the present embodiment, the similarity selector 10 selects the maximum value $s_a$ and the median value $s_b$ from among the similarity group S in step S5.

The score calculator 11 calculates the score as follows based on the two similarities $s_a$ and $s_b$ selected by the similarity selector 10 and substitutes it in a variable TS.

$TS \leftarrow \sqrt{s_b} - \sqrt{s_a}$ [formula 14]

By calculating the score in this way, the estimation accuracy of the bias can be improved under the condition to be indicated below.

A condition is considered where the effects by external factors on the measured value pack reduce the similarity relative to the reference model. Under this condition, when an appropriate bias estimation is performed, it is expected that outliers from the median value $s_b$ in the similarity group S are distributed on a side less than the median value $s_b$ and outliers on the side higher than the median value $s_b$ are unlikely. Therefore, when the difference between the median value $s_b$ and the maximum value $s_a$ in the similarity group S is large, a possibility that the bias estimation is inappropriate is considered high. However, even when the median value $s_b$ is close to the maximum value $s_a$, the estimation is not considered as a correct estimation in a case where $s_a$ and $s_b$ themselves are small. Therefore, the difference between the square root of $s_a$ and the square root of $s_b$ is employed as the score in order to reduce the difference between $s_a$ and $s_b$ and to increase the values of $s_a$ and $s_b$.

As described above, according to the present embodiment, the score can be calculated based on the median value $s_b$ and the maximum value $s_a$ of the similarity group S. The score of the present embodiment may be used alone and may be used together with the score described in the first embodiment.

Fourth Embodiment

A bias estimation apparatus and method according to a fourth embodiment will be described with reference to FIGS. 8 to 10. In the present embodiment, a measured value pack includes qualitative variables and their biases are estimated by converting them into the corresponding quantitative variables.

Figure 8:
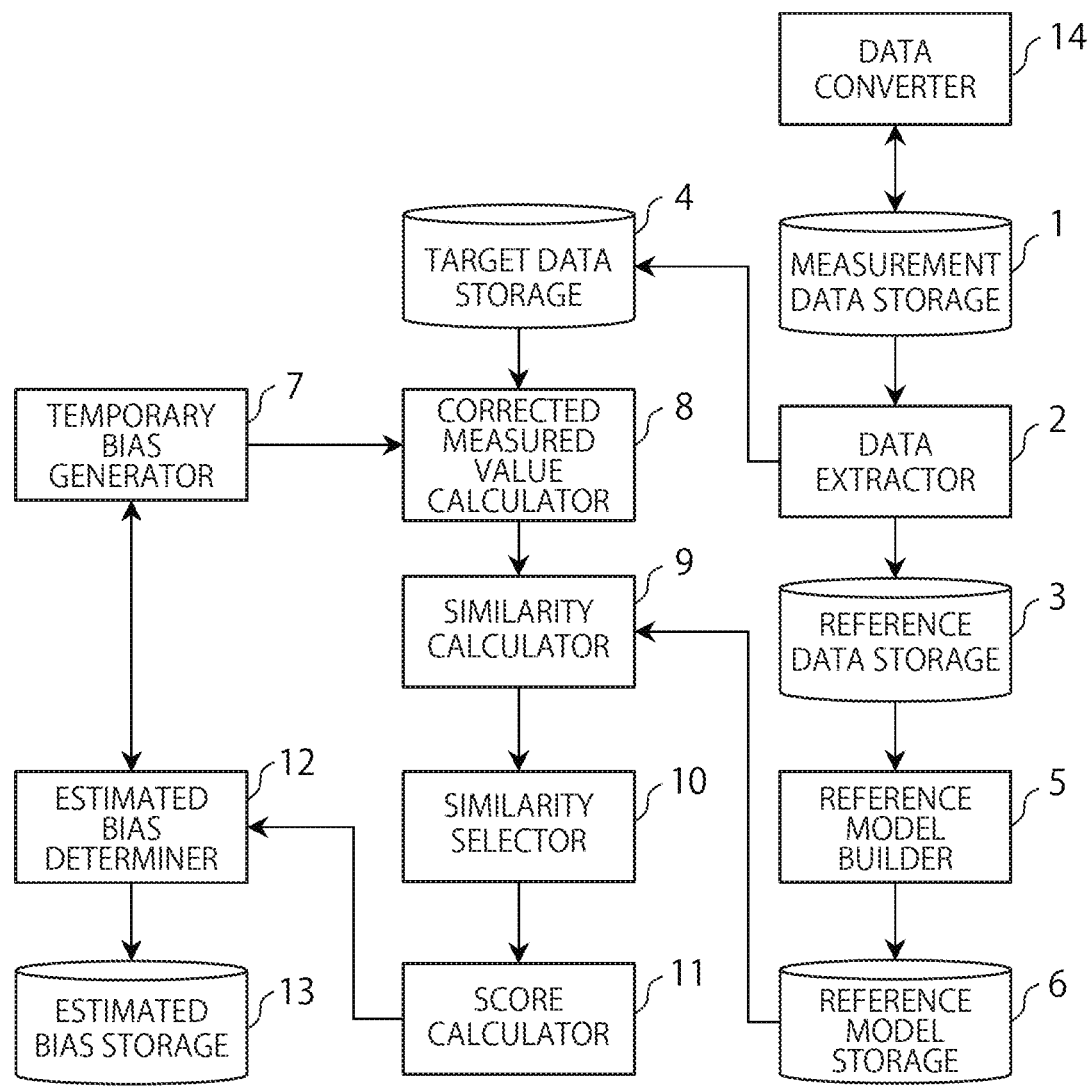
FIG. 8 is a block diagram of a function configuration of a bias estimation apparatus according to a fourth embodiment.

Here, FIG. 8 is a block diagram of a function configuration of the bias estimation apparatus according to the present embodiment. As illustrated in FIG. 8, the bias estimation apparatus further includes a data converter 14. Other components are similar to those of the first embodiment.

The data converter 14 converts the qualitative variables included in a measurement data group stored in a measurement data storage 1 into the quantitative variables. The qualitative variable is a variable which cannot be expressed as a quantity such as an object name ("human", "car", and the like) and a state ("present", "absent", and the like).

Figures 9, 10:
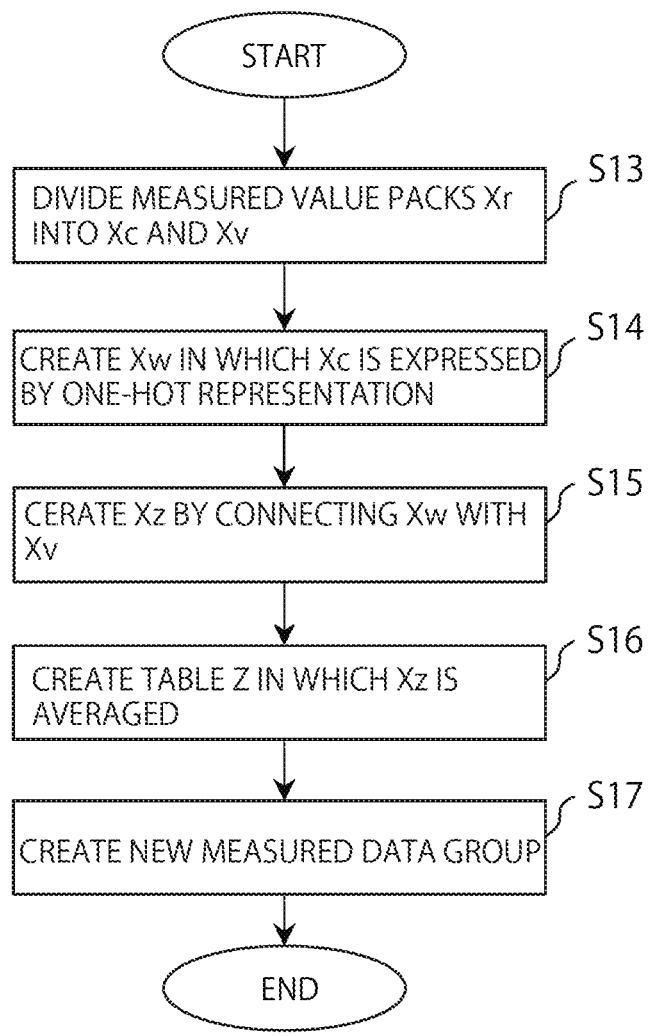
FIG. 9 is a diagram of an exemplary measurement data including a qualitative variable.
FIG. 10 is a flowchart of a data conversion method.

FIG. 9 is a diagram of an exemplary measurement data group including the qualitative variable. As illustrated in FIG. 9, each measurement data of the measurement data group includes a measured date, an object name, an X-coordinate, and a Y-coordinate. The measured date is in a related information pack, and the object name, the X-coordinate, and the Y-coordinate are in a measured value pack. The measurement data group of FIG. 9 is obtained, for example, from an image sensor.

The object name in FIG. 9 indicates the name of an object taken in the image sensor, and the X-coordinate and the Y-coordinate are Cartesian coordinates whose origins are located at points on the image and indicate a position of the object taken in the image sensor. Since the object name such as "human" and "car" cannot be expressed as a quantity, the object name is the qualitative variable. On the other hand, since the X-coordinate and the Y-coordinate can be indicated as a quantity, they are the quantitative variables. That is, the measurement data group in FIG. 9 includes both the quantitative variable and the qualitative variable.

The data converter 14 obtains the measurement data group as that in FIG. 9 from the measurement data storage 1 and converts the qualitative variables included in the measurement data group into the quantitative variables. The conversion from the qualitative variables into the quantitative variables by the data converter 14 can be realized according to an optional method such as a one-hot representation. The measurement data converted by the data converter 14 is stored in the measurement data storage 1 as a new measurement data. The bias estimation apparatus can estimate the bias included in the measured values of a qualitative variable by using the measurement data group converted by the data converter 14.

For example, in the image sensor, when "human" is frequently measured in a reference state and "car" is frequently measured in a case where the measurement by the image sensor includes a bias, the data converter 14 converts qualitative measured values "human" and "car" into the measurement frequencies of "human" and "car". The measurement frequencies are quantitative and can be used to estimate the bias of the image sensor indirectly.

Here, a conversion method from the qualitative variables into the quantitative variables will be described with reference to FIG. 10. FIG. 10 is a flowchart of an operation of the data converter 14.

First, in step S13, the data converter 14 obtains the measurement data group from the measurement data storage 1 and divides the measured value packs of the obtained measurement data group into a qualitative variable part and a quantitative variable part. Here, it is assumed that the measured value packs of the measurement data group obtained from the measurement data storage 1 by the data converter 14 be expressed by a table Xr of N rows and n columns including the measured values measured by the n sensors for N times.

The data converter 14 extracts a table Xc of N rows and m columns from the table Xr. Xc includes only the qualitative variables and the number m indicates the number of the qualitative variables. Also, the data converter 14 extracts a table Xv of N rows and (n−m) columns from the table Xr. Xv includes only the quantitative variables and the number (n−m) indicates the number of the quantitative variables. Accordingly, the table Xr is divided into the table Xc including only the qualitative variables and the table Xv including only the quantitative variables.

In step S14, the data converter 14 converts the table Xc into the one-hot representation and creates a table Xw of N rows and h columns. The number h depends on the number of possible values of each qualitative variable included in the table Xc. For example, when the table Xc has N rows and one qualitative variable "object name" and it takes a value from two possible values, i.e., "human" and "car", the table Xw becomes a table of N rows and two columns.

In step S15, the data converter 14 connects the table Xw with the table Xv and creates a table Xz. The table Xz has N rows and (n−m+h) columns.

In step S16, the data converter 14 groups the respective rows of the table Xz for each optional period (for example, one hour or one day) by using the measured date on which the values in each row of Xz are measured. The measured dates for grouping the rows are extracted from among the related information packs of the measurement data group obtained from the measurement data storage 1. When the table Xz is grouped for each day, for example, a group of 01/01 to 01/02 is Xz[0] and a group of 01/02 to 01/03 is Xz[1] in a case where it is assumed that the i-th group be Xz[i].

Next, the data converter 14 creates a table of one row and (n−m+h) columns for each group. In the present embodiment, the created table for Xz[i] stores the average value of each column of Xz[i]. The data converter 14 creates a table Z in which the created tables are connected. When M groups have been created, the table Z has M rows and (n−m+h) columns.

In step S17, the data converter 14 creates related information packs corresponding to the table Z by using the related information packs of the measurement data group obtained from the measurement data storage 1. For example, when the first row of the table Z represents the average measured values from 01/01 to 01/02, the related information such as "measured period: 01/01 to 01/02" is created and it is associated as the related information of the first row of the table Z. Accordingly, a new measurement data group is created which has the table Z as the measured value packs and the above-mentioned related information from the original measurement data group as the related information packs. The created new measurement data group is stored in the measurement data storage 1.

With the above structure, according to the present embodiment, the bias of the sensor of which the measured value is qualitative such as the image sensor can be estimated. Also, even when the measured value packs of the measurement data includes both qualitative variables and quantitative variables, the bias of each sensor can be estimated by converting the qualitative variables into the quantitative variables.

Fifth Embodiment

Figures 11, 12:
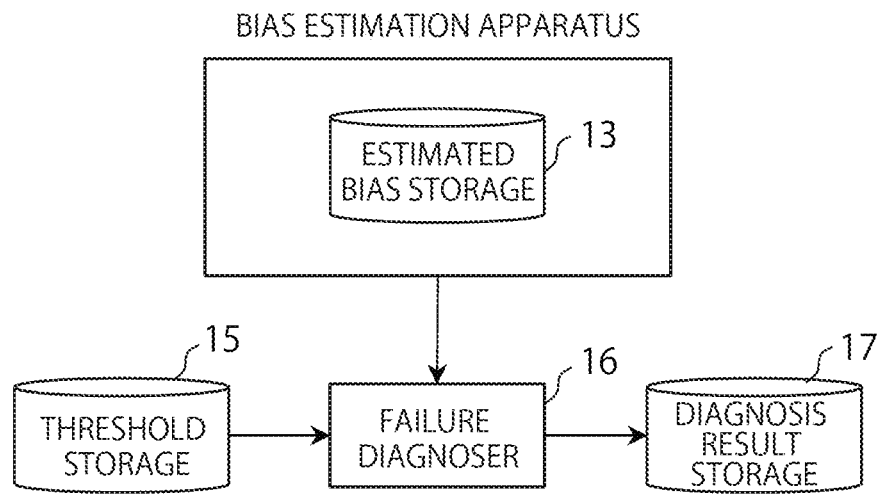
FIG. 11 is a block diagram of a function configuration of a failure diagnosis apparatus according to a fifth embodiment.
FIG. 12 is a diagram of an exemplary threshold data group.

A failure diagnosis apparatus and method according to a fifth embodiment will be described with reference to FIGS. 11 to 15. In the present embodiment, a failure of the sensor is diagnosed based on the estimated bias estimated by the bias estimation apparatus and method according to the embodiments described above. Here, FIG. 11 is a block diagram of a function configuration of the failure diagnosis apparatus. As illustrated in FIG. 11, the failure diagnosis apparatus includes a bias estimation apparatus, a threshold storage 15, a failure diagnoser 16, and a diagnosis result storage 17.

The bias estimation apparatus can be optionally selected from among the bias estimation apparatuses according to the embodiments described above. In FIG. 11, regarding the structure of the bias estimation apparatus, components other than the estimated bias storage 13 are not shown in the figure.

Figures 13, 14:
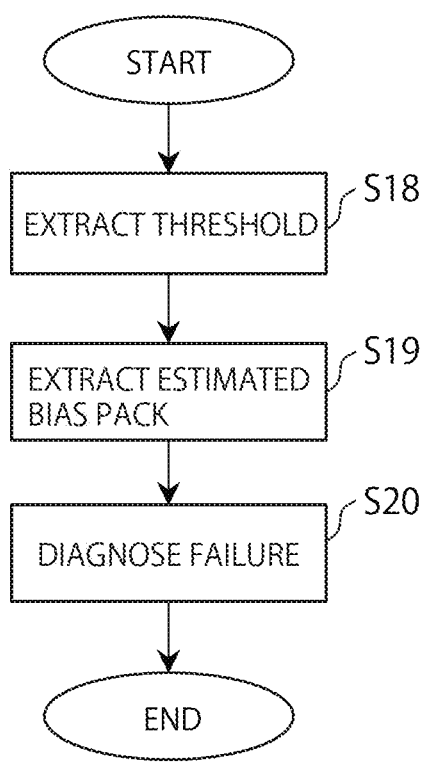
FIG. 13 is a diagram of another example of the threshold data group.
FIG. 14 is a flowchart of an operation of the failure diagnosis apparatus.

The threshold storage 15 stores a threshold to determine whether a bias failure occurs in the sensor. The threshold has the same unit as that of the measured value by the corresponding sensor and is set by the user according to specifications of the sensor and the like. The threshold storage 15 stores the threshold with the corresponding sensor name and the unit of the measured value as a threshold data. Here, FIGS. 12 and 13 are diagrams of a plurality of exemplary threshold data stored in the threshold storage 15. Each threshold data includes the sensor name, the threshold, and the unit in FIG. 12. That is, in the threshold data in FIG. 12, a single threshold is set for each sensor. For example, a threshold of a sensor A is 1° C.

In the threshold data in FIG. 13, each threshold data includes the sensor name, the season, the threshold, and the unit. That is, a plurality of seasons is set for each sensor, and the threshold is set for each season. For example, a threshold of the sensor A in the summer is 1° C., and that in the winter is 3° C. In this way, when the related information corresponding to a sensor is available, the threshold of the sensor may be set for each value of the related information. Accordingly, the accuracy of the failure diagnosis can be improved.

The failure diagnoser 16 diagnoses whether the bias failure occurs in each sensor based on the estimated bias of each sensor stored in the estimated bias storage 13 and the threshold of each sensor stored in the threshold storage 15. The failure diagnoser 16 makes a diagnosis that the bias failure occurs in the sensor when the estimated bias is larger than the threshold. The diagnosis result by the failure diagnoser 16 is stored in the diagnosis result storage 17.

Each function configuration of the failure diagnosis apparatus can be realized by making a computer device 100 execute a failure diagnosis program similarly to the bias estimation apparatus.

Next, the failure diagnosis method according to the present embodiment will be described with reference to FIGS. 14 and 15. FIG. 14 is a flowchart of an operation of the failure diagnosis apparatus according to the present embodiment.

In step S18, the failure diagnoser 16 extracts the threshold of the sensor to be diagnosed from the threshold storage 15. When the number of the sensors to be the diagnosis target is n, n thresholds are extracted. The failure diagnoser 16 substitutes each extracted threshold into a variable referred as H.

In step S19, the failure diagnoser 16 extracts the estimated bias of the sensor to be diagnosed from the estimated bias storage 13. When the number of the sensors to be diagnosed is n, n estimated biases are extracted. The failure diagnoser 16 substitutes the absolute value of each extracted estimated bias into a variable referred as ba. By using the absolute value of the estimated bias, the failure diagnosis can be performed without considering whether the estimated bias is positive or negative.

In step S20, the failure diagnoser 16 diagnoses whether the bias failure occurs in the sensor by comparing the variable H of the sensor with the variable ba of the sensor. The failure diagnoser 16 makes a diagnosis that the sensor of which the variable ba is larger than the variable H has the bias failure. On the other hand, the failure diagnoser 16 makes a diagnosis that the sensor of which the variable ba is equal to or less than the variable H is in the normal condition. The diagnosis result by the failure diagnoser 16 is stored in the diagnosis result storage 17. The diagnosis result stored in the diagnosis result storage 17 can be displayed by the display device 103.

Here, FIG. 15 is a diagram of a plurality of exemplary diagnosis results displayed by the display device 103. In FIG. 15, the diagnosis result of each sensor includes the sensor name, the estimated bias, the threshold, and the unit. For example, since the estimated bias of the sensor A is 2° C. and the threshold is 1° C. (H<ba), the sensor A is diagnosed as having the failure.

As described above, according to the present embodiment, the bias failure of the sensor can be diagnosed by using the estimated bias by the bias estimation apparatus and method described above.

In step S19, the original value of the estimated bias not the absolute value of the estimated bias may be substituted into the variable ba. In this case, the upper threshold limit value or the lower threshold limit value for the failure diagnosis of the sensor may be set in the threshold storage 15. Also, the two thresholds, i.e., the upper threshold limit value and the lower threshold limit value may be set. In these cases, the failure diagnoser 16 may diagnose that the bias failure occurs when the value of the estimated bias is outside the range defined by the upper and/or lower threshold limit values.

Sixth Embodiment

Figure 16:
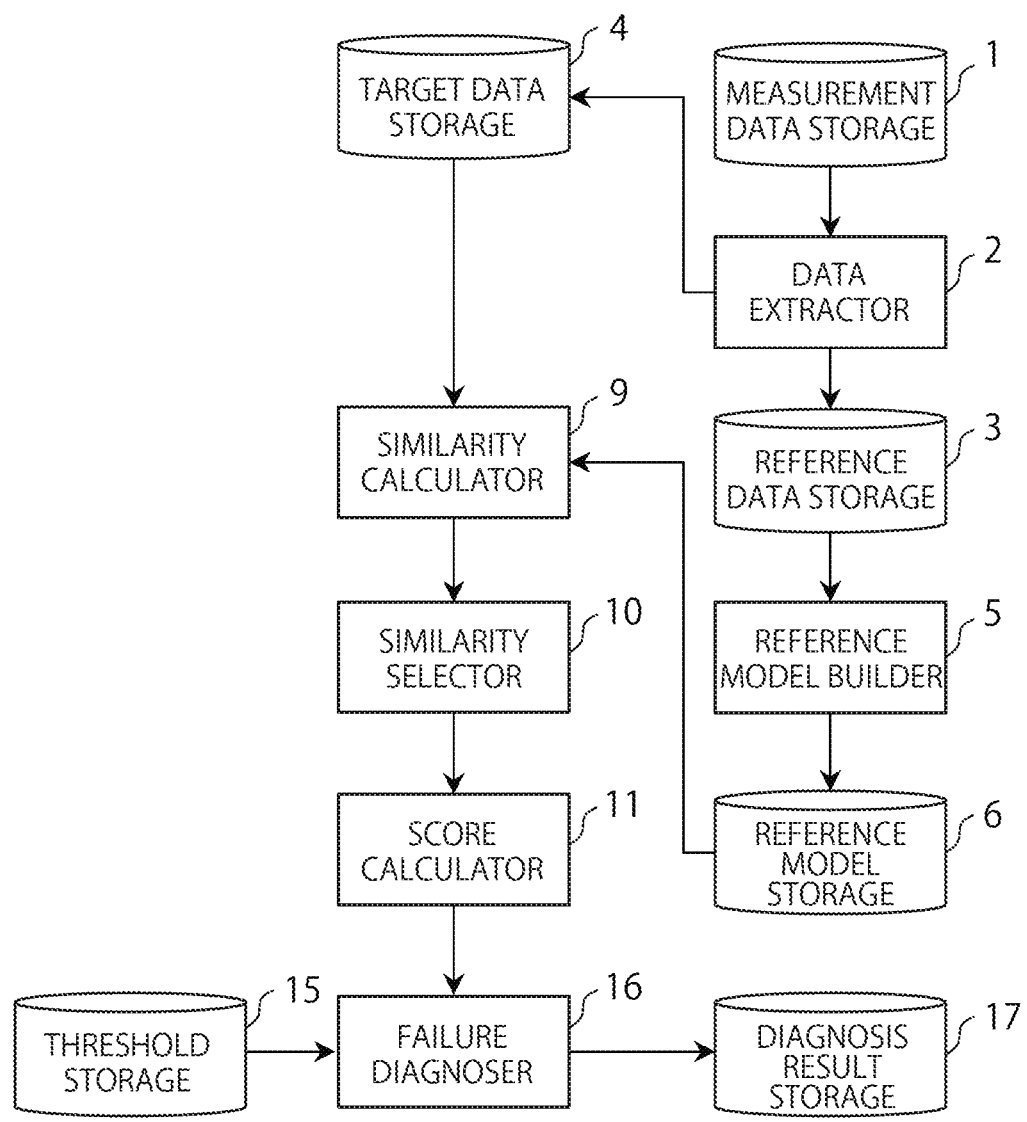
FIG. 16 is a block diagram of a function configuration of a failure diagnosis apparatus according to a sixth embodiment.

A failure diagnosis apparatus and method according to a sixth embodiment will be described with reference to FIG. 16. In the present embodiment, a failure of sensors or devices measured by the sensors is diagnosed based on a score. Here, FIG. 16 is a block diagram of a function configuration of the failure diagnosis apparatus. As illustrated in FIG. 16, the failure diagnosis apparatus includes a measurement data storage 1, a data extractor 2, a reference data storage 3, a target data storage 4, a reference model builder 5, a reference model storage 6, a similarity calculator 9, a similarity selector 10, a score calculator 11, a threshold storage 15, a failure diagnoser 16, and a diagnosis result storage 17. Since the failure diagnosis apparatus does not estimate a bias of the sensor, it is not necessary for the failure diagnosis apparatus to include the temporary bias generator 7, the corrected measured value calculator 8, the estimated bias determiner 12, and the estimated bias storage 13 unlike the failure diagnosis apparatus according to the fifth embodiment.

In the present embodiment, the similarity calculator 9 calculates similarities based on a reference model stored in the reference model storage 6 and a target data group stored in the target data storage 4. Here, the lower calculated similarity means higher possibility that some failures occur.

The similarity calculator 9 calculates the similarity for each target data. The similarity calculator 9 generates a similarity data including the similarity and related information which is same as that of the target data used in calculating the similarity. Since the similarity calculator 9 generates the similarity data for each target data, a plurality of the similarity data (similarity data group) as many as the target data included in a target data group is generated. A method for calculating the similarity by the similarity calculator 9 is as described above.

The similarity selector 10 selects a plurality of the similarity data calculated by the similarity calculator 9 according to their similarities. The group of the similarity data selected by the similarity selector 10 is used to calculate a score. A method for selecting the similarity data by the similarity selector 10 is as described above.

The score calculator 11 calculates the score based on the similarity data group selected by the similarity selector 10. The score is a value in which the similarity between the measured value packs of the target data group and those of the reference data group is evaluated based on the reference model in the reference model storage 6. The score is, for example, an average value, a median, and a mode of the similarities included in the selected similarity data group. However, the score is not limited to these. A method for calculating the score by the score calculator 11 is as described above.

The threshold storage 15 stores a threshold to determine whether some failures occur in the sensors or the devices measured by the sensors. The threshold is for the score and is optionally set by a user. The threshold is stored in the threshold storage 15 as the threshold data. The threshold data is conditioned according to related information such as kinds of the sensors to be diagnosed. For example, when the sensors to be diagnosed include a thermometer and a hygrometer, the corresponding threshold may be 1.0. When the sensors include only the thermometer, the corresponding threshold may be 2.0. When the condition indicated by the related information pack of the target data group matches only the one stored in the threshold storage 15, the threshold related to the condition is used for the failure diagnosis of the target data group. On the other hand, when the condition of the target data group matches a plurality of conditions stored in the threshold storage 15, the threshold used for the failure diagnosis of the target data group is generated according to a predetermined method. The threshold to be generated is, for example, the maximum value, the minimum value, and the average value of the thresholds corresponding to the matched conditions. However, the method to generate the threshold is not limited to these. Also, the threshold data used for failure diagnosis in any condition may be prepared by a user and stored in the threshold storage 15.

The failure diagnoser 16 diagnoses whether some failures occur in the sensors or the devices measured by the sensors by using the score calculated by the score calculator 11 and the threshold of the score extracted from the threshold storage 15 based on the condition of the target data group. When the calculated score is smaller than the threshold, the failure diagnoser 16 makes a diagnosis that some failures occur in the sensors or the devices measured by the sensors. The diagnosis result by the failure diagnoser 16 is stored in the diagnosis result storage 17.

The failure diagnosis apparatus can make the diagnosis that some failures occur in the sensors or the devices measured by the sensors by performing the processing in steps S1, S4 to S6, S18, and S20 described above.

That is, the reference model builder 5 builds the reference model in step S1. In step S4, the similarity calculator 9 calculates the similarity of each target data included in the target data group base on the reference model. In step S5, the similarity selector 10 selects the similarities in the top 10% of the similarity group S. The score calculator 11 calculates a score TS of the target data group in step S6. In step S18, the failure diagnoser 16 extracts the threshold of the score from the threshold storage 15 based on the condition of the target data group. In step S20, the failure diagnoser 16 diagnoses whether the failure occurs in the sensors or the devices measured by the sensors by comparing the score with the threshold.

As described above, according to the present embodiment, the failure of the sensors or the devices measured by the sensors can be diagnosed by using the score.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A bias estimation apparatus for estimating biases in sensors, comprising:
   a memory configured to:
   store a plurality of first measured value packs each including measured values by the sensors acquired in a first single measurement during a first period after inspection of the sensors; and
   store a plurality of second measured value packs each including measured values by the sensors acquired in a second single measurement action during a second period after the first period, the second period corresponding to a target period for estimation of the biases of the sensors; and processing circuitry configured to:
   (1) generate a trained neural network by learning based on the first measured value packs, the trained neural network being configured to output values having same values as the measured values included in each of the first measured value packs;
   (2) generate random numbers, generate temporary values of the biases of the sensors in the second period based on the random numbers, and generate a temporary bias pack including the temporary values;
   (3) subtract the temporary bias pack from each of the second measured value packs to obtain a plurality of corrected measured value packs;
   (4) calculate a plurality of similarities between a set of the plurality of first measured value packs and the plurality of corrected measured value packs by inputting the corrected measured value packs into the trained neural network to obtain a plurality of acquired values, wherein the plurality of similarities are calculated based on a sum of squares of the calculated differences between the plurality of first measured value packs and the acquired values;
   (5) select part of the similarities in an order from a largest value of the similarities;
   (6) calculate a score for the temporary bias pack based on the part of the similarities;
   (7) iterate processes of (1) to (6) to obtain scores for a plurality of temporary bias packs;
   (8) select one of the plurality of temporary bias packs based on the scores; and
   (9) determine that the temporary values included in the selected one of the plurality of temporary bias packs are estimated biases of the sensors.

2. The apparatus according to claim 1, wherein the processing circuitry calculates one of an average value, a median, and a mode of the part of the similarities, the part of the similarities including two or more similarities, and the calculated one being the score.

3. The apparatus according to claim 1, wherein the processing circuitry selects the temporary bias pack with a maximum of the scores from among the plurality of temporary bias packs.

4. The apparatus according to claim 1, wherein the processing circuitry calculates the score based on both a maximum value of the part of the similarities and a median of the part of the similarities, the part of the similarities including two or more similarities.

5. The apparatus according to claim 4, wherein the processing circuitry calculates a difference of square roots of the maximum value and the median, the calculated difference being the score.

6. The apparatus according to claim 1, further comprising:
a data converter, implemented in a processor, configured to convert qualitative variables into quantitative variables by a one-hot representation,
wherein the measured values by the sensors include the quantitative variables converted from the qualitative variables by the data converter.

7. The apparatus according to claim 1, wherein the biases of the sensors in the first period are assumed to be zero.

8. The apparatus according to claim 1 wherein the processing circuitry diagnoses failures of the sensors based on the scores.

9. The apparatus according to claim 1, wherein the processing circuitry diagnoses failures of the sensors based on the estimated biases.

10. A bias estimation method for estimating biases in sensors, comprising:
(1) providing a plurality of first measured value packs each including measured values by the sensors acquired in a first single measurement during a first period after inspection of the sensors;
(2) providing a plurality of second measured value packs each including measured values by the sensors acquired in a second single measurement action during a second period after the first period, the second period corresponding to a target period for estimation of the biases of the sensors;
(3) generating a trained neural network by learning based on the first measured value packs, the trained neural network being configured to output values having same values as the measured values included in each of the first measured value packs;
(4) generating random numbers, generating temporary values of the biases of the sensors in the second period based on the random numbers, and generating a temporary bias pack including the temporary values;
(5) subtracting the temporary bias pack from each of the second measured value packs to obtain a plurality of corrected measured value packs;
(6) calculating a plurality of similarities between a set of the plurality of first measured value packs and the plurality of corrected measured value packs by inputting the corrected measured value packs into the trained neural network to obtain a plurality of acquired values, wherein the plurality of similarities are calculated based on a sum of squares of the calculated differences between the plurality of first measured value packs and the acquired values;
(7) selecting part of the similarities in an order from a largest value of the similarities;
(8) calculating a score for the temporary bias pack based on the part of the similarities;
(9) iterating processes of (3) to (8) to obtain scores for a plurality of temporary bias packs;
(10) selecting one of the plurality of temporary bias packs based on the scores; and
(11) determining that the temporary values included in the selected one of the plurality of temporary bias packs are estimated biases of the sensors.

11. The method according to claim 10, further comprising:
converting qualitative variables into quantitative variables by a one-hot representation,
wherein the measured values by the sensors include the quantitative variables converted from the qualitative variables.

12. The method according to claim 10, comprising:
diagnosing failures of the sensors based on the scores.

13. The method according to claim 10, comprising:
diagnosing failures of the sensors based on the estimated biases.

* * * * *

UNITED STATES PATENT AND TRADEMARK OFFICE
CERTIFICATE OF CORRECTION

PATENT NO. : 11,410,059 B2
APPLICATION NO. : 15/420640
DATED : August 9, 2022
INVENTOR(S) : Takuro Moriyama et al.

It is certified that error appears in the above-identified patent and that said Letters Patent is hereby corrected as shown below:

In the Claims

Claim 1, Column 18, Line 36, "same" should read as --the same--.

Claim 10, Column 19, Line 45, "same" should read as --the same--.

Signed and Sealed this
Ninth Day of May, 2023

Katherine Kelly Vidal
*Director of the United States Patent and Trademark Office*